US012613686B2

(12) United States Patent
Zhang et al.

(10) Patent No.: US 12,613,686 B2
(45) Date of Patent: Apr. 28, 2026

(54) SOFTWARE MODULE DEPLOYMENT METHODS AND APPARATUS

(71) Applicant: Siemens Aktiengesellschaft, Munich (DE)

(72) Inventors: Chuan Yu Zhang, Beijing (CN); Dong Li, Beijing (CN); Xiao Bo Yang, Beijing (CN); Tong Zhou Wang, Beijing (CN); Yao Lei Kang, Beijing (CN); Jian Yong Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 267 days.

(21) Appl. No.: 18/557,041

(22) PCT Filed: Apr. 25, 2021

(86) PCT No.: PCT/CN2021/089706
§ 371 (c)(1),
(2) Date: Oct. 24, 2023

(87) PCT Pub. No.: WO2022/226703
PCT Pub. Date: Nov. 3, 2022

(65) Prior Publication Data
US 2024/0241709 A1     Jul. 18, 2024

(51) Int. Cl.
*G06F 8/61* (2018.01)
(52) U.S. Cl.
CPC ...................................... *G06F 8/63* (2013.01)
(58) Field of Classification Search
CPC ........................................................ G06F 8/63
See application file for complete search history.

(56) References Cited

U.S. PATENT DOCUMENTS 9,092,292 B2 * 7/2015 Matov ........................ G06F 8/61
10,348,767 B1 7/2019 Lee .......................... H04L 63/20
(Continued)

FOREIGN PATENT DOCUMENTS

CN 110 716 734 1/2020 ............. G06F 8/656
CN 112035121 A 12/2020 ............... G06F 8/60
(Continued)

OTHER PUBLICATIONS

Search Report for International Application No. PCT/CN2021/089706, 13 pages, Dec. 30, 2021.
(Continued)

*Primary Examiner* — Marina Lee
(74) *Attorney, Agent, or Firm* — Slayden Grubert Beard PLLC

(57) ABSTRACT
Various embodiments include a software module deployment method comprising: acquiring a self-description file of at least one edge device with a management device, the self-description file at least describing a software running environment and hardware resource information of the edge device; deploying a software module mirror image on a suitable edge device and establishing a connection relationship between different software module instances deployed on the edge device; automatically allocating, with the management device, a port number to be used when communication is actually performed to each software module instance deployed on the edge device; and generating a configuration file according to the software module instance deployed on each edge device, the connection relationship between different software module instances on the edge device, and the port number.

13 Claims, 5 Drawing Sheets

(56) References Cited

U.S. PATENT DOCUMENTS

| | | | | |
|---|---|---|---|---|
| 11,349,710 | B1 * | 5/2022 | Nelson | A61K 39/395 |
| 2018/0131579 | A1 * | 5/2018 | Jacobs | H04L 41/022 |
| 2020/0117477 | A1 * | 4/2020 | Aly | G06F 8/60 |
| 2021/0019131 | A1 | 1/2021 | Tulsian et al. | |
| 2021/0058338 | A1 | 2/2021 | Liu | H04L 47/82 |
| 2021/0117859 | A1 | 4/2021 | Rogers | G06N 20/00 |
| 2021/0216583 | A1 | 7/2021 | Wu | G06F 16/51 |
| 2022/0206868 | A1 * | 6/2022 | Dreyer | G06F 9/44505 |
| 2024/0430238 | A1 * | 12/2024 | Rossetti | H04L 63/0884 |

FOREIGN PATENT DOCUMENTS

| | | | | |
|---|---|---|---|---|
| CN | 112235122 A | 1/2021 | | H04L 12/24 |
| CN | 112 667 293 | 4/2021 | | G06F 9/4401 |

OTHER PUBLICATIONS

Extended European Search Report, Application No. 21938194.4, 8 pages, Jan. 14, 2025.

* cited by examiner

SOFTWARE MODULE DEPLOYMENT METHODS AND APPARATUS

CROSS-REFERENCE TO RELATED APPLICATIONS

This application is a U.S. National Stage Application of International Application No. PCT/CN2021/089706 filed Apr. 25, 2021, which designates the United States of America, the contents of which are hereby incorporated by reference in their entirety.

TECHNICAL FIELD

The present disclosure relates generally to the technical field of the industrial Internet of Things. Various embodiments of the teachings herein include software module deployment methods and apparatus.

BACKGROUND

Edge computing is playing an ever more important role in industrial scenarios. Edge devices are closer to data sources than cloud servers, so by using edge devices as platforms for data processing, a faster response and better safety can be provided.

As an architecture for organizing software application programs, microservices are also widely used on account of their outstanding flexibility and expandability. The deployment of microservices on edge devices has already become a commonly used implementation approach in today's IOT field, and can solve many technical problems.

Certain existing container editing tools deploy microservice programs. For example, Docker is a commonly used container, and commonly used container editing tools based on Docker include Docker Compose and Docker Swarm. Docker Compose and Docker Swarm can deploy microservices, but are still very complex. The user must edit a configuration file, and when a large number of microservices are present, the dependence relationships between microservices and devices are very easy to confuse with each other.

Furthermore, applications of edge computing and microservices in the industrial field are very different from those in the consumer field, with more restrictions in industrial applications. For example, there is a lot of different field data for which direct communication with an IP network is impossible, and the requirements for real-time performance are sometimes very stringent.

SUMMARY

A brief summary of the teachings of the present disclosure is given below, in order to provide a basic understanding of certain aspects. It should be understood that this summary is not an exhaustive summary of the present disclosure. It is not intended to determine key or important parts, nor is it intended to define the scope thereof. Its purpose is merely to set out certain concepts in simplified form, as a preamble to the more detailed description discussed later.

As an example, some embodiments of the teachings of the present disclosure include a software module deployment method and apparatus, which use a graphical management tool to establish a dependence relationship between an edge device and a software module mirror image, and automatically convert the dependence relationship to a configuration file, and can thereby actually deploy a software module on an edge device according to the configuration file.

As another example, some embodiments include a software module deployment method comprising: a management device acquiring a self-description file of at least one edge device, the self-description file at least describing a software running environment and hardware resource information of the edge device; on a graphical interface of a graphical management tool of the management device, deploying a software module mirror image on a suitable edge device and establishing a connection relationship between different software module instances deployed on the edge device; the management device automatically allocating, to each software module instance deployed on the edge device, a port number to be used when communication is actually performed; and generating a configuration file according to the software module instance deployed on each edge device, the connection relationship between different software module instances on the edge device, and the port number. In this way, it is possible to describe a dependence relationship between a software module and an edge device graphically and automatically allocate a communication port number, and it is thus possible to generate a configuration file for container deployment automatically on the basis of the graphically described dependence relationship, saving a large amount of work writing a configuration file.

In some embodiments, the software module deployment method further comprises: according to the configuration file, using a container editing tool to actually install, on an edge device, a software module mirror image on the management device, and establishing a connection relationship between software module instances on the edge device. In this way, an existing container editing tool can be used to accomplish the deployment of software modules on the basis of the generated configuration file.

In some embodiments, the step of deploying a software module mirror image on a suitable edge device comprises: deploying a software module mirror image on a suitable edge device on the basis of at least one of the following: the software running environment and hardware resource information of the edge device, hardware and software requirements of the software module mirror image in the management device, and user demands.

In some embodiments, the step of deploying the software module mirror image on a suitable edge device comprises at least one of the following: deploying a software module mirror image requiring a specific hardware resource on an edge device having the specific hardware resource; deploying a software module mirror image capable of realizing communication protocol conversion for an edge device incapable of connecting to an IP network; and deploying a software module mirror image having a real-time performance requirement on an edge device having real-time computing capability. In this way, specific demands of edge devices and software modules in industrial application fields can be adapted to.

In some embodiments, the software module deployment method further comprises: displaying, on the graphical interface, a running state, connection relationship and port number of a software module instance installed on the edge device. In this way, the deployment and running state of software modules can be monitored in a visually direct manner.

As another example, some embodiments include a method for deploying a software module on an edge device comprising: the edge device providing a self-description file thereof to a management device, the self-description file at least describing a software running environment and hardware resource information of the edge device; the edge device receiving a software module mirror image deployed by the management device and installing same; and an installed software module instance performing communication via a port number allocated by the management device.

In some embodiments, the method further comprises: the edge device reporting a running state of the software module instance to the management device.

As another example, some embodiments include a software module deployment apparatus disposed on a management device, comprising: a self-description file acquisition unit, configured to acquire a self-description file of at least one edge device, the self-description file at least describing a software running environment and hardware resource information of the edge device; a deployment unit, configured to deploy a software module mirror image on a suitable edge device and establish a connection relationship between different software module instances deployed on the edge device, according to an instruction of a user, on a graphical interface of a graphical management tool of the management device; a port number allocating unit, configured to automatically allocate, to each software module instance deployed on the edge device, a port number to be used when communication is actually performed; and a configuration file generating unit, configured to generate a configuration file according to the software module instance deployed on each edge device, the connection relationship between different software module instances on the edge device, and the port number.

As another example, some embodiments include an edge computing system comprising: a management device and at least one edge device, wherein the management device deploys a software module on the at least one edge device according to the method described above.

As another example, some embodiments include a computing device comprising: at least one processor; and a memory coupled to the at least one processor, the memory being used to store an instruction which, when executed by the at least one processor, causes the processor to execute one or more of the methods described herein.

As another example, some embodiments include a non-transitory machine-readable storage medium storing an executable instruction which, when executed, causes the machine to execute one or more of the methods described herein.

As another example, some embodiments include a computer program comprising a computer-executable instruction which, when executed, causes at least one processor to execute one or more of the methods described herein.

As another example, some embodiments include a computer program product tangibly stored on a computer-readable medium and comprising a computer-executable instruction which, when executed, causes at least one processor to execute one or more of the methods described herein.

BRIEF DESCRIPTION OF THE DRAWINGS

The objectives, characteristics, and advantages of various teachings of the present disclosure are more easily understood with reference to the following description of example embodiments in conjunction with the drawings. The components in the drawings are merely intended to show the principles of the present invention. In the drawings, identical or similar technical features or components will be indicated by identical or similar reference labels. In the drawings.

Figure 1:
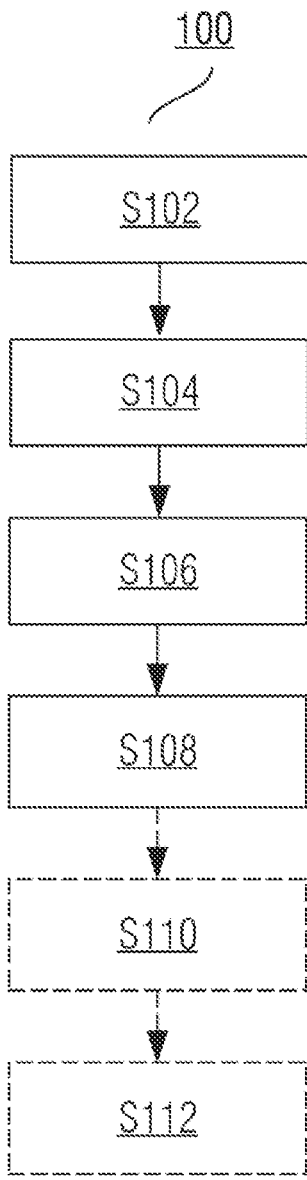
FIG. 1 is a flow chart of an exemplary process of a software module deployment method executed on a management device incorporating teachings of the present disclosure.

| Key to the drawings: | |
|---|---|
| 100: software module deployment method | S102, S104, S106, S108, S110, S112: steps |
| 200: method for deploying software module on edge device | S202, S204, S206, S208: steps |
| 300: software module deployment apparatus | 302: self-description file acquisition unit |
| 304: deployment unit | 306: port number allocating unit |
| 308: configuration file generating unit | 310: installation unit |
| 312: monitoring unit | 400: edge computing system |
| 402: management device | 404-1, 404-2: edge devices |
| 406-A, 406-B, 406-C: software module mirror images | 408-A, 408-B, 408-C: software module instances |
| 502: processor | 504: memory |
| 500: computing device | |

DETAILED DESCRIPTION

The subject matter described herein will now be discussed with reference to exemplary embodiments. It should be understood that these embodiments are discussed merely in order to enable those skilled in the art to better understand and thereby implement the subject matter described herein, and are not a limitation on the protection scope, applicability or examples expounded in the claims. The functions and arrangement of the elements discussed may be changed without departing from the protection scope of the content of the present disclosure. Various processes or components may be omitted from, replaced in or added to the examples as required. For example, the method described may be executed in a different order from that described, and various steps may be added, omitted or combined. Furthermore, features described in relation to some examples may also be combined in other examples.

As used herein, the term "comprises" and variants thereof represent open terms, meaning "includes but is not limited to". The term "based on" means "at least partly based on". The terms "one embodiment" and "an embodiment" mean "at least one embodiment".

The term "another embodiment" means "at least one other embodiment". The terms "first", "second", etc. may denote different or identical objects. Other definitions, either explicit or implicit, may be included below. Unless clearly specified in the context, the definition of a term is consistent throughout the Description.

An edge computing system generally comprises three types of hardware device: edge hub, edge management device (edge master) and edge device.

The edge hub is a cloud platform for remote management and monitoring; the edge management device is a main node for a user management container image, describing a microservice dependence relationship, limiting and generating a configuration file; and the edge device is a real environment for executing a microservice.

The methods described herein mainly relate to an edge management device (abbreviated as management device hereinbelow) and an edge device; on the edge management device, a graphical management tool is used to establish a dependence relationship between the edge device and a software module mirror image, and the dependence relationship is automatically converted to a configuration file, and it is thereby possible to actually deploy a software module on the edge device according to the configuration file.

An example software module deployment method according to embodiments of the present disclosure is described in specific terms below in conjunction with the drawings. In general, the software module deployment methods relate to two aspects: a management device and an edge device.

FIG. 1 is a flow chart of an exemplary process of a software module deployment method 100 executed on a management device incorporating teachings of the present invention.

First of all, in step S102, a management device receives a self-description file of at least one edge device, the self-description file at least describing a software running environment and hardware resource information of the edge device. A single management device might be associated with multiple edge devices, each edge device having a self-description file, the self-description file describing a software running environment and hardware resource information of the edge device itself, e.g. a supported field bus (e.g. PROFINET), process image, etc.

Next, in step S104, on a graphical interface of a graphical management tool of the management device, deploying a software module mirror image on a suitable edge device and establishing a connection relationship different between software module instances deployed on an edge device. Multiple software module mirror images are stored on the management device, and displayed on the graphical interface of the graphical management tool of the management device. The graphical management tool is typically pre-developed software stored on the management device. The software module mirror image may be installed on a suitable edge device as required. Firstly, on the graphical interface of the graphical management tool, the software module mirror image is virtually deployed on a suitable edge device.

The software module mirror image may be virtually deployed on a suitable edge device on the basis of at least one of the following: the software running environment and hardware resource information of the edge device, hardware and software requirements of the software module mirror image in the management device, and user demands.

Specifically, when the software module mirror image is deployed, the following situations may exist for example: Installation/running of the software module mirror image might have corresponding requirements regarding edge device hardware resources, so when a software module is deployed on an edge device, it is necessary to take into account hardware requirement information of the software module mirror image and hardware resource information of the edge device itself. For example, if a software module mirror image requires a specific type of hardware resource, then the software module mirror image must be deployed on an edge device having such a hardware resource.

In situations where hardware of certain edge devices cannot be connected to an IP network directly, a specific software module may be deployed for an edge device to achieve a connection between the edge device and the IP network. For example, in the case of an edge device having a field bus, this cannot be connected directly to an IP network, but a software interface module may be deployed, this module being able to achieve communication protocol conversion, reading field bus data from a lower layer and sending same to an upper-layer IP network, and reading upper-layer IP network data and sending same to the edge device.

In addition, in the case of a software module having a real-time performance requirement, a real-time container may be deployed on an edge device having real-time computing capability (the real-time container may be realized in many different ways, which are not described in detail here). Situations which may be encountered when deploying a software module mirror image on an edge device are described here illustratively through specific examples: the software module has hardware requirements for the edge device, the edge device requires a specific software module to communicate with an upper-layer system, and the software module has a real-time performance requirement. In addition, the user may deploy the required software module mirror image on an edge device according to actual needs.

In this disclosure, a microservice software module is called a software module mirror image when on a management device; once a software module mirror image has been deployed on an edge device, it is called a software module instance. In addition to deploying a software module mirror image on an edge device, a connection may be established, on a graphical interface, between software module instances having a dependence relationship. These software module instances might be deployed on a single edge device, or might be deployed on different edge devices.

Through step S104 above, on the graphical interface of the graphical management tool, dependence relationships between an edge device and a software module mirror image and between different software module mirror images were established by a graphical method.

Next, in step S106, the management device automatically allocates, to each software module instance deployed on the edge device, a port number to be used when communication is actually performed. If communication is performed between two software module instances deployed on different edge devices, then the port numbers allocated are physical port numbers of the edge devices; if communication is performed between two software module instances deployed on the same edge device, then the port numbers allocated may be physical port numbers of the edge device, or virtual port numbers of a container on the edge device.

In step S108, a configuration file is generated according to the software module instance deployed on each edge device, the connection relationship between different software module instances on the edge device, and the port number. The configuration file describes information such as a correspondence between software module mirror images and edge devices, the connection relationship between different software module instances, and port numbers for communication between software module instances.

Through the process described above, a configuration file for deploying software modules on edge devices can be obtained, and software module mirror images can be actually installed on edge devices according to the deployment file.

In some embodiments, the software module deployment method further comprises a step S110: according to the configuration file, a software module mirror image on the management device is actually deployed on an edge device using a container editing tool, and a connection relationship between software module instances on the edge device is established. Those skilled in the art may select an existing container editing tool in the prior art as required to deploy the software module mirror image; for example, when Docker is used as a container to deploy the software module mirror image, Docker Compose or Docker Swarm may be used as the container editing tool. The container and container editing tool used when deploying the software module mirror image are not defined in the present invention.

Once the software module mirror image on the management device has been actually installed on the edge device, the software module deployment method further comprises a step S112: a running state, connection relationship and port number of the software module instance installed on the edge device are displayed on the graphical interface. In this way, the user is enabled to learn and monitor the deployment and running situation of the software module on the edge device in a visually direct way.

Figure 2:
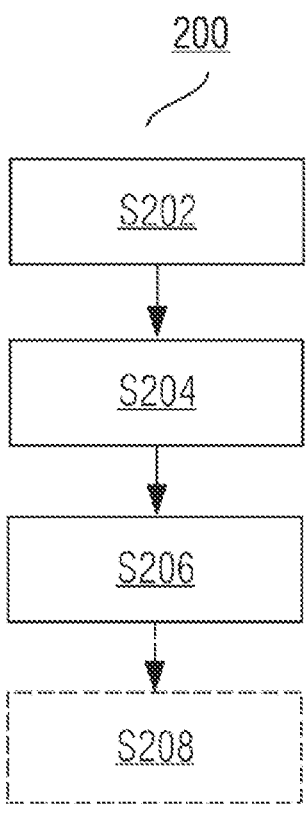
FIG. 2 shows a flow chart of an exemplary process of a method for deploying a software module on an edge device incorporating teachings of the present disclosure.

Next, a software module deployment method executed at the edge device side according to a second aspect of embodiments of the present invention is described. FIG. 2 shows a flow chart of an exemplary process of a method 200 for deploying a software module on an edge device incorporating teachings of the present disclosure.

In step S202, an edge device provides a self-description file thereof to a management device, the self-description file at least describing a software running environment and hardware resource information of the edge device. As stated above, each edge device has a self-description file, which describes information such as the software running environment and hardware resource information of the edge device itself. The edge device opens access permission to the management device, so that the management device can acquire software running environment information and hardware resource information of the edge device.

Next, in step S204, the edge device receives a software module mirror image deployed by the management device and installs same. As stated above, according to the configuration file generated, the software module mirror image on the management device is actually deployed on the edge device by the management device, and a connection relationship between software module instances on the edge device is established. Thus, when the management device has completed the deployment of a suitable software module mirror image on the edge device, the edge device may install the deployed software module instance.

In step S206, the installed software module instance performs communication via a port number allocated by the management device. In some embodiments, the software module deployment method 200 further comprises a step S208: the edge device reports a running state of the software module instance to the management device. In this way, running state information of the software module instance on the edge device may be reported to the management device, and the running state of the software module instance can thus be monitored on the graphical interface of the management device.

Figure 3:
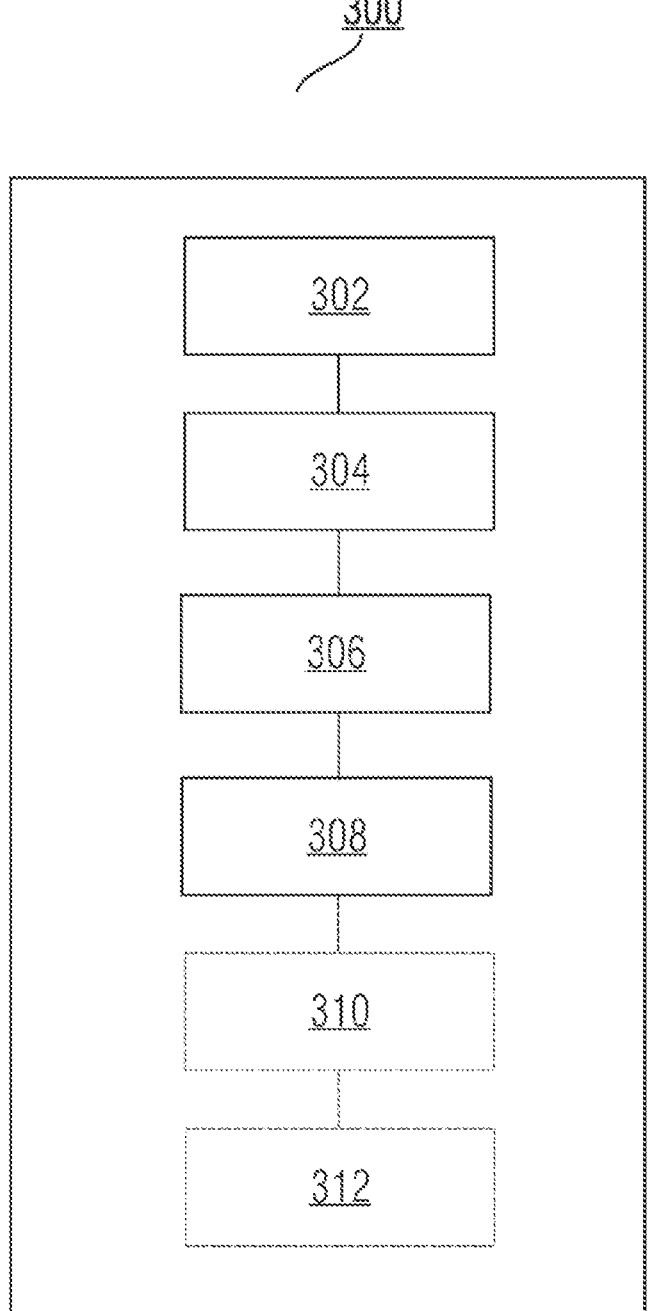
FIG. 3 is a block diagram of an exemplary configuration of a software module deployment apparatus incorporating teachings of the present disclosure.

Some embodiments include a software module deployment apparatus, which is disposed on a management device. FIG. 3 is a block diagram of an exemplary configuration of a software module deployment apparatus 300 incorporating teachings of the present disclosure. As shown in FIG. 3, the software module deployment apparatus 300 comprises: a self-description file acquisition unit 302, a deployment unit 304, a port number allocating unit 306 and a configuration file generating unit 308. The self-description file acquisition unit 302 is configured to acquire a self-description file of at least one edge device, the self-description file at least describing a software running environment and hardware resource information of the edge device; the deployment unit 304 is configured to deploy a software module mirror image on a suitable edge device and establish a connection relationship between different software module instances deployed on the edge device, according to an instruction of a user, on a graphical interface of a graphical management tool of the management device; the port number allocating unit 306 is configured to automatically allocate, to each software module instance deployed on the edge device, a port number to be used when communication is actually performed; and the configuration file generating unit 308 is configured to generate a configuration file according to the software module instance deployed on each edge device, the connection relationship between different software module instances on the edge device, and the port number.

In some embodiments, the software module deployment apparatus 300 further comprises an installation unit 310, the installation unit 310 being configured to: according to the configuration file, use a container editing tool to actually install, on an edge device, a software module mirror image on the management device, and establish a connection relationship between software module instances on the edge device. The deployment unit 304 is further configured to: deploy a software module mirror image on a suitable edge device on the basis of at least one of the following: the software running environment and hardware resource information of the edge device, hardware and software requirements of the software module mirror image in the management device, and user demands.

In some embodiments, the deployment unit 304 is further configured to perform at least one of the following: deploy a software module mirror image requiring a specific hardware resource on an edge device having the specific hardware resource; deploy a software module mirror image capable of realizing communication protocol conversion for an edge device incapable of connecting to an IP network; and deploy a software module mirror image having a real-time performance requirement on an edge device having real-time computing capability.

In some embodiments, the software module deployment apparatus 300 further comprises a monitoring unit 312, the monitoring unit 312 being configured to display, on the graphical interface, a running state, connection relationship and port number of a software module instance installed on the edge device.

In some embodiments, the software module deployment apparatus 300 is disposed on the management device, and separately used to execute the corresponding steps of embodiments of the software module deployment method described above with reference to FIG. 1; details of the operations and functions of the various parts of the software module deployment apparatus 300 may be identical or similar to the relevant parts of embodiments of the software module deployment method 100 of the present invention described with reference to FIG. 1, so are not described in detail again here. The structure of the software module deployment apparatus 300 shown in FIG. 3 and component units thereof is merely exemplary, and those skilled in the art may amend the structural block diagram shown in FIG. 3 as required.

Figure 4:
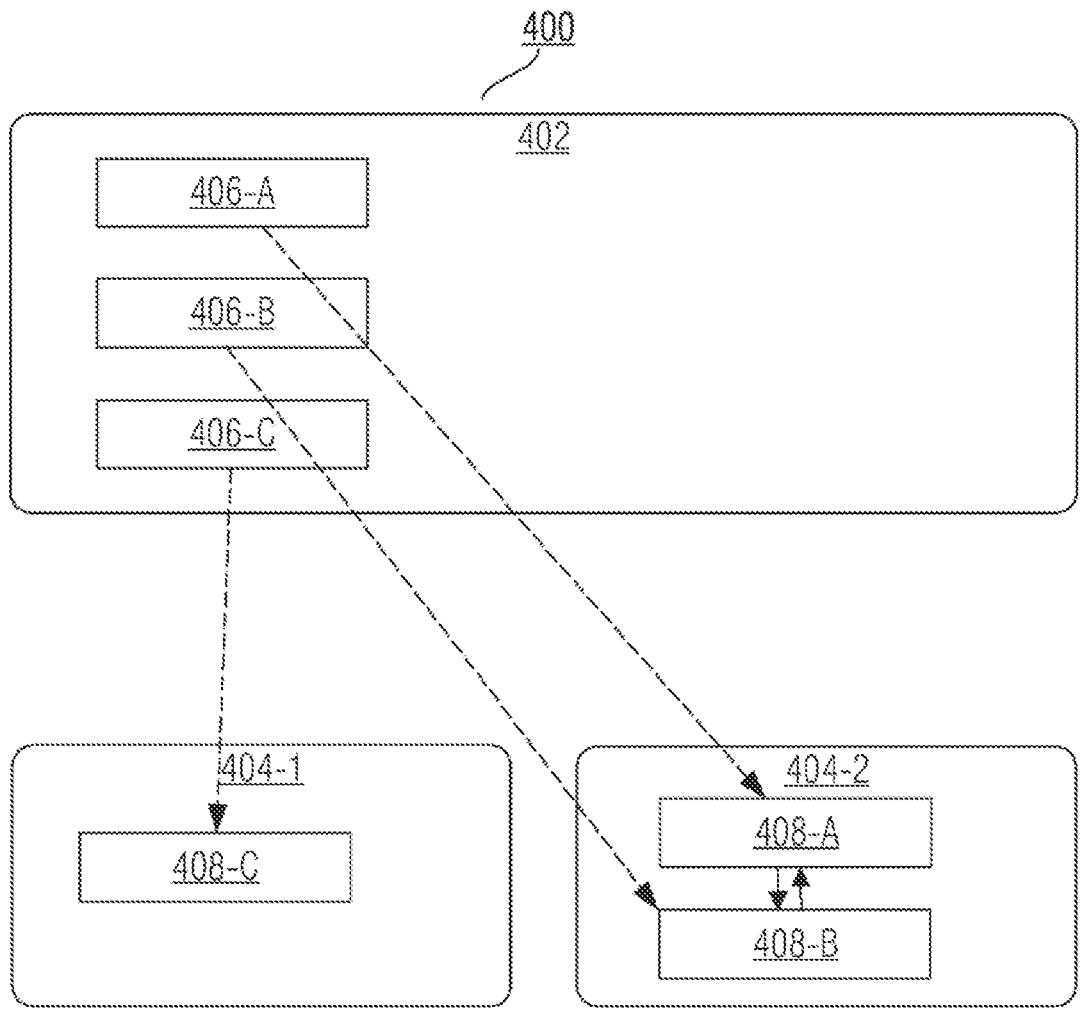
FIG. 4 is a block diagram of an exemplary configuration of an edge computing system incorporating teachings of the present disclosure.

FIG. 4 is a block diagram of an exemplary configuration of an edge computing system 400 incorporating teachings of the present disclosure. The edge computing system 400 comprises a management device 402 and multiple edge devices 404-1 and 404-2, etc. Two edge devices are shown in FIG. 4, but those skilled in the art will understand that in the edge computing system according to the present invention, the number of edge devices may be any number greater than one. Multiple software module mirror images 406-A, 406-B and 406-C are stored on the management device 402.

The software module deployment method described above with reference to FIG. 1 may be executed on the management device 400, and the software module deployment method described above with reference to FIG. 2 may be executed separately on edge devices 404-1 and 404-2, thus realizing the separate deployment of software module mirror images 406-A, 406-B and 406-C on suitable edge devices.

For example, software module mirror images 406-A and 406-B are deployed on edge device 404-2, generating software module instances 408-A and 408-B; software module mirror image 406-C is deployed on edge device 404-1, generating software module instance 408-C. The specific operation steps may be identical or similar to the relevant parts of embodiments of the software module deployment method 100 and the method 200 for deploying a software module on an edge device described with reference to FIGS. 1 and 2, so are not described in detail again here.

The software module deployment method and apparatus incorporating teachings the present disclosure may have at least one of the following advantages. The software module deployment method and apparatus can describe a dependence relationship between a software module and an edge device graphically and automatically allocate a communication port number, and can thus generate a configuration file for container deployment automatically on the basis of the graphically described dependence relationship, saving a large amount of work writing a configuration file. The software module deployment method and apparatus may be adaptable to specific demands of edge devices and software modules in industrial application fields. The software module deployment method and apparatus can also monitor the deployment and running state of software modules in a visually direct way.

The software module deployment method and apparatus according to embodiments of the present disclosure have been described above with reference to FIGS. 1-3. The various units of the software module deployment apparatus described above may be realized with hardware, software, or a combination of hardware and software.

Figure 5:
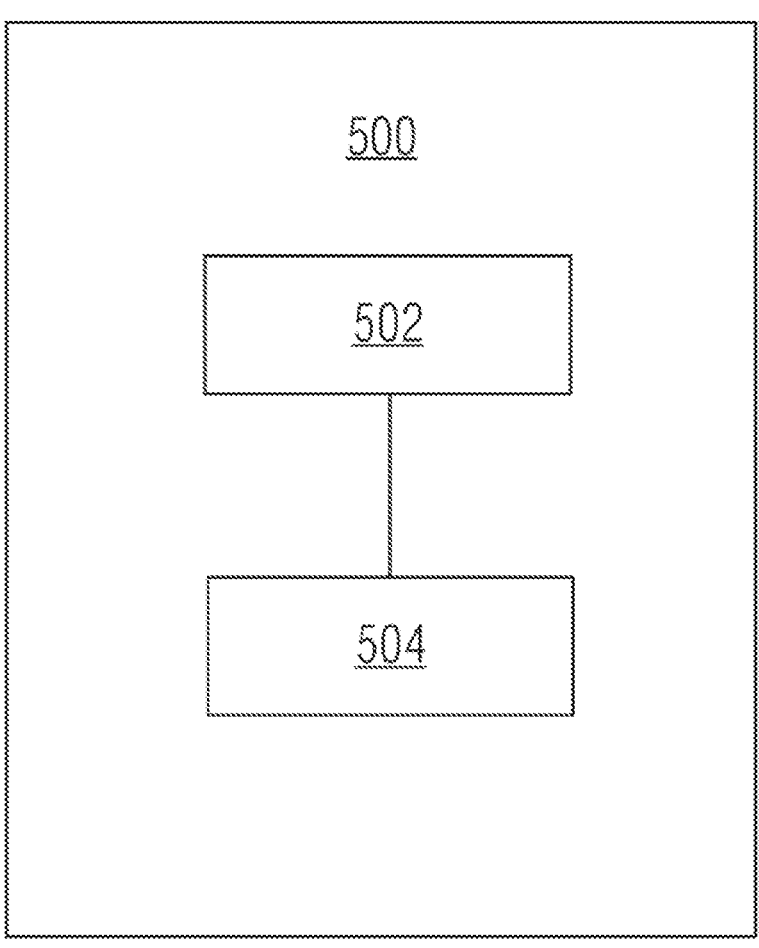
FIG. 5 shows a block diagram of a computing device for realizing software module deployment incorporating teachings of the present disclosure.

FIG. 5 shows a block diagram of a computing device 500 for realizing information processing incorporating teachings of the present disclosure. In some embodiments, the computing device 500 may comprise at least one processor 502, the processor 502 executing at least one computer-readable instruction (i.e. the abovementioned element realized in the form of software) stored or encoded in a computer-readable storage medium (i.e. a memory 804). It should be understood that a computer-executable instruction stored in a memory 504, when executed, causes at least one processor 802 to perform the various operations and functions described above with reference to FIGS. 1-3.

In some embodiments, a non-transitory machine-readable medium may have a machine-executable instruction (i.e. the abovementioned element realized in the form of software)

which, when executed by a machine, causes the machine to execute various operations and functions described above with reference to FIGS. 1-3.

In some embodiments, a computer program comprises a computer-executable instruction which, when executed, causes at least one processor to execute various operations and functions described above with reference to FIGS. 1-3.

In some embodiments, a computer program product comprises a computer-executable instruction which, when executed, causes at least one processor to execute various operations and functions described above with reference to FIGS. 1-3.

It should be understood that all of the embodiments in this description are described in a progressive manner; for parts that are identical or similar in two embodiments, it is sufficient to refer to one embodiment while reading the other, and vice versa; and the description of each embodiment focuses on features that differ from other embodiments. For example, the embodiments relating to the apparatus, embodiments relating to the computing device and embodiments relating to the machine-readable storage medium above are described in relatively simple terms because they are essentially similar to the method embodiments; for related parts, it is sufficient to refer to part of the description of the method embodiments.

Specific embodiments have been described above. Other embodiments are within the scope of the attached claims. In some situations, actions or steps recorded in the claims may be executed in a different order from that in the embodiments and still achieve the desired result. Furthermore, the processes depicted in the drawings do not necessarily require the displayed specific order or consecutive order in order to achieve the desired result. In some embodiments, multi-task processing and parallel processing are also possible or possibly advantageous.

Not all of the steps and units in the structural drawings of the processes and systems above are necessary; some steps or units may be omitted according to actual needs. The apparatus structures described in the embodiments above may be physical structures or logic structures, e.g. some units might be realized by the same physical entity, or some units might be realized by multiple physical entities separately, or may be realized jointly by certain components in multiple independent devices.

The specific implementations expounded above with reference to the drawings describe exemplary embodiments, but do not represent all embodiments that can be realized or that fall within the scope of protection of the claims. The term "exemplary" used means "serving as an example, instance or illustration", and does not mean "preferred" or "advantageous" compared to other embodiments. In order to provide an understanding of the technologies described, specific embodiments include specific details. However, these technologies may be implemented in the absence of these specific details. In some instances, to avoid making the concepts of the described embodiments difficult to understand, well known structures and apparatuses are shown in the form of block diagrams.

The above description of the content of the present disclosure is provided to enable any person skilled in the art to realize or use the content of the present disclosure. To a person skilled in the art, various modifications to the content of the present disclosure will be obvious, and the general principles defined herein may be applied to other variants without departing from the scope of protection of the content of the present disclosure. Thus, the content of the present disclosure is not limited to the examples and designs described herein, but is consistent with the broadest scope conforming to the principles and novel features disclosed herein.

The above are merely example embodiments of the teachings of the present disclosure, which are not intended to limit the scope thereof. Any modifications, equivalent substitutions, or improvements, etc. made within the spirit and principles of the present disclosure should be included in the scope of protection thereof.

The invention claimed is:

1. A software module deployment method comprising:

acquiring a self-description file from at least one edge device with a management device, the self-description file at least describing a software running environment and hardware resource information of the edge device;

deploying a software module mirror image on a suitable edge device and establishing a connection relationship between different software module instances deployed on the edge device;

automatically allocating, with the management device, a port number to be used when communication is actually performed to each software module instance deployed on the edge device; and generating a configuration file according to the software module instance deployed on each edge device, the connection relationship between different software module instances on the edge device, and the port number.

2. The method as claimed in claim 1, further comprising:

using a container editing tool to actually install, on an edge device, a software module mirror image from the management device according to the configuration file; and establishing a connection relationship between software module instances on the edge device.

3. The method as claimed in claim 1, wherein deploying a software module mirror image on a suitable edge device comprises deploying a software module mirror image on a suitable edge device on the basis of at least one of the following: the software running environment and hardware resource information of the edge device, hardware and software requirements of the software module mirror image in the management device, and user demands.

4. The method as claimed in claim 1, wherein deploying the software module mirror image on a suitable edge device comprises at least one of the following:

deploying a software module mirror image requiring a specific hardware resource on an edge device having the specific hardware resource;

deploying a software module mirror image capable of realizing communication protocol conversion for an edge device incapable of connecting to an internet protocol (IP) network; and deploying a software module mirror image having a real-time performance requirement on an edge device having real-time computing capability.

5. The method as claimed in claim 1, further comprising displaying, on a graphical interface, a running state, connection relationship, and port number of a software module instance installed on the edge device.

6. A method for deploying a software module on an edge device, the method comprising:

transmitting a self-description file from the edge device to a management device, the self-description file at least describing a software running environment and hardware resource information of the edge device;

receiving a software module mirror image deployed by the management device and installing the mirror image on the edge device; and performing communication via a port number allocated by the management device on an installed software module instance.

7. The method as claimed in claim 6, further comprising reporting a running state of the software module instance from the edge device to the management device.

8. A software module deployment apparatus disposed on a management device, the apparatus comprising:

a self-description file acquisition unit configured to acquire a self-description file from at least one edge device, the self-description file at least describing a software running environment and hardware resource information of the edge device;

a deployment unit configured to deploy a software module mirror image on a suitable edge device and establish a connection relationship between different software module instances deployed on the edge device, according to an instruction of a user, on a graphical interface of a graphical management tool of the management device;

a port number allocating unit configured to automatically allocate, to each software module instance deployed on the edge device, a port number to be used when communication is actually performed; and a configuration file generating unit configured to generate a configuration file according to the software module instance deployed on each edge device, the connection relationship between different software module instances on the edge device, and the port number.

9. The apparatus as claimed in claim 8, further comprising an installation unit configured to, according to the configuration file, use a container editing tool to actually install, on an edge device, a software module mirror image on the management device, and establish a connection relationship between software module instances on the edge device.

10. The apparatus as claimed in claim 8, wherein the deployment unit is further configured to deploy a software module mirror image on a suitable edge device on the basis of at least one of the following: the software running environment and hardware resource information of the edge device, hardware and software requirements of the software module mirror image in the management device, and user demands.

11. The apparatus as claimed in claim 8, wherein the deployment unit is further configured to execute at least one of the following:

deploying a software module mirror image requiring a specific hardware resource on an edge device having the specific hardware resource;

deploying a software module mirror image capable of realizing communication protocol conversion for an edge device incapable of connecting to an internet protocol (IP) network; and deploying a software module mirror image having a real-time performance requirement on an edge device having real-time computing capability.

12. The apparatus as claimed in claim 8, further comprising a monitoring unit configured to display, on the graphical interface, a running state, connection relationship, and port number of a software module instance installed on the edge device.

13. An edge computing system comprising:

a management device; and at least one edge device storing a self-description file;

wherein the management device is operable to deploy a software module on the at least one edge device by:

acquiring the self-description file from the at least one edge device with a management device, the self-description file at least describing a software running environment and hardware resource information of the edge device;

deploying a software module mirror image on a suitable edge device and establishing a connection relationship between different software module instances deployed on the edge device;

automatically allocating, with the management device, a port number to be used when communication is actually performed to each software module instance deployed on the edge device; and generating a configuration file according to the software module instance deployed on each edge device, the connection relationship between different software module instances on the edge device, and the port number.

* * * * *